United States Patent
James

(10) Patent No.: US 10,746,240 B2
(45) Date of Patent: Aug. 18, 2020

(54) TROLLEY FOR SUPPORTING A HEAVY VEHICLE BRAKE ASSEMBLY

(71) Applicant: Truck & Bus Technology PTY LTD, Coomboona, Vic (AU)

(72) Inventor: Allan Martin James, Riddells Creek (AU)

(73) Assignee: Truck & Bus Technology PTY LTD, Coomboona, VIC (AU)

( * ) Notice: Subject to any disclaimer, the term of this patent is extended or adjusted under 35 U.S.C. 154(b) by 135 days.

(21) Appl. No.: 15/739,183

(22) PCT Filed: Jun. 30, 2016

(86) PCT No.: PCT/AU2016/050571
§ 371 (c)(1),
(2) Date: Dec. 22, 2017

(87) PCT Pub. No.: WO2017/000040
PCT Pub. Date: Jan. 5, 2017

(65) Prior Publication Data
US 2018/0180118 A1 Jun. 28, 2018

(30) Foreign Application Priority Data
Jun. 30, 2015 (AU) .................. 2015902552

(51) Int. Cl.
*F16D 65/00* (2006.01)
*B25B 11/02* (2006.01)
(52) U.S. Cl.
CPC .......... *F16D 65/0043* (2013.01); *B25B 11/02* (2013.01); *F16D 2250/0084* (2013.01)
(58) Field of Classification Search
CPC .............................. F16D 65/0043; B25B 11/02
(Continued)

(56) References Cited

U.S. PATENT DOCUMENTS 3,402,455 A * 9/1968 Converse .............. B25B 27/023
29/261
5,077,886 A * 1/1992 Hashimoto ............. B23P 19/04
29/434
(Continued)

FOREIGN PATENT DOCUMENTS

AU 2015 203 336 1/2016
FR 2 956 852 9/2011
(Continued)

OTHER PUBLICATIONS

WIPO, International Search Report, WO 2017/000040, dated Jan. 5, 2017.

*Primary Examiner* — Jason L Vaughan
(74) *Attorney, Agent, or Firm* — Emerson Thomson Bennett, LLC; Daniel A. Thomson

(57) ABSTRACT

A system for removing and reinstalling a heavy vehicle brake assembly, including: a calliper support assembly configured to engage and support an in-situ calliper, the calliper support assembly being liftable and retractable from the vehicle with the calliper engaged to remove and subsequently reengage a calliper with the hub assembly; a hub engagement assembly configured to engage an accessible portion of an in-situ hub and rotor assembly, the hub engagement assembly being configured to support and move the engaged hub and rotor assembly between an in-situ position and a removed position for removal and reinstallation of the hub and rotor assembly; and means within the system for manoeuvring the brake assembly to facilitate servicing.

14 Claims, 9 Drawing Sheets

(58) Field of Classification Search
USPC .................................................... 294/81.3
See application file for complete search history.

(56) References Cited

U.S. PATENT DOCUMENTS

| | | | | |
|---|---|---|---|---|
| 5,127,638 | A * | 7/1992 | Kent | B62B 3/04 |
| | | | | 254/133 R |
| 5,167,057 | A * | 12/1992 | Somerville | B25B 27/026 |
| | | | | 269/17 |
| 5,895,030 | A * | 4/1999 | Mohun | B60B 29/002 |
| | | | | 254/7 R |
| 7,766,306 | B2 * | 8/2010 | Morey | B66F 3/36 |
| | | | | 254/133 R |
| 8,347,474 | B2 * | 1/2013 | Oachs | B25B 27/023 |
| | | | | 29/244 |
| 9,377,067 | B2 * | 6/2016 | Mellberg | B23P 19/04 |
| 9,771,990 | B2 * | 9/2017 | Slee | B66F 9/06 |
| 2004/0093713 | A1 | 5/2004 | Laird et al. | |
| 2005/0081355 | A1 | 4/2005 | Nechvatal | |
| 2009/0158570 | A1 | 6/2009 | Morey | |
| 2015/0198208 | A1 * | 7/2015 | Mellberg | B23P 19/04 |
| | | | | 294/67.1 |

FOREIGN PATENT DOCUMENTS

| | | |
|---|---|---|
| GB | 2 199 300 | 7/1988 |
| WO | 2013 191 620 | 12/2013 |

* cited by examiner

TROLLEY FOR SUPPORTING A HEAVY VEHICLE BRAKE ASSEMBLY

FIELD OF THE INVENTION

The present invention relates to a trolley for supporting a heavy vehicle brake assembly.

BACKGROUND OF THE INVENTION

Inspection, removal and servicing of a brake assembly for heavy vehicles is difficult and time consuming, mainly due to the significant weight of the brake assembly. For example, a brake calliper may weigh in excess of 30 kg and a rotor and hub assembly can weigh in excess of 100 kg. Due to the weight and general awkwardness of the location of the brake assembly, removal of the calliper and the hub and rotor assembly both require more than one person to perform. Apart from being time consuming, generally inconvenient and costly, using manual labour to remove a heavy vehicle brake assembly can also raise health and safety concerns in respect of service technicians due to the weight and unusual lifting actions required.

Preferred embodiments of the invention seek to provide a trolley for supporting a heavy vehicle brake assembly to address the above concerns.

SUMMARY OF THE INVENTION

According to one embodiment of the present invention, there is provided a trolley for supporting a heavy vehicle brake assembly, the trolley being configured to engage and support the brake assembly to facilitate removal and installation, the trolley including:
  a calliper support assembly configured to engage and support an in-situ calliper, the calliper support assembly being movable with the calliper engaged to remove and subsequently reengage a calliper with the brake assembly;
  a hub engagement assembly configured to engage an accessible portion of an in-situ hub and rotor assembly, the hub engagement assembly being configured to support and move the engaged hub and rotor assembly between an in-situ position and a removed position to facilitate removal and installation of the hub and rotor assembly; and
  means within the trolley for raising the hub engagement assembly to facilitate servicing.

According to a preferred embodiment, the trolley is configured to be positionable relative to the brake assembly for engagement thereof and movable away from the vehicle to facilitate removal of the brake assembly.

Preferably, the trolley further includes means for removing the hub and rotor assembly from an axle of the vehicle. Preferably, the trolley further includes separation means for separating the rotor and the hub, the separation means being configured to support the rotor during removal from the hub.

The hub engagement member can be configured to engage wheel studs of the hub assembly. The calliper engagement member can include a pair of hooks configured to engage an inner portion of the calliper. The calliper engagement member can be mounted on a swing arm to allow the supported calliper to be removed from the brake assembly.

In a preferred form, the means within the trolley for raising the hub engagement assembly to facilitate servicing is a lifting device, such as for example a scissor lift, which may be operated by hydraulic or electric power. A hydraulic or electric press may similarly be used.

According to another embodiment of the present invention, there is provided a system for removing and reinstalling a heavy vehicle brake assembly, including:
  a calliper support assembly configured to engage and support an in-situ calliper, the calliper support assembly being liftable and retractable from the vehicle with the calliper engaged to remove and subsequently reengage a calliper with the hub assembly;
  a hub engagement assembly configured to engage an accessible portion of an in-situ hub and rotor assembly, the hub engagement assembly being configured to support and move the engaged hub and rotor assembly between an in-situ position and a removed position for removal and reinstallation of the hub and rotor assembly; and
  means within the system for manoeuvring the brake assembly to facilitate servicing.

According to a preferred embodiment, the calliper support assembly is fixable to the calliper via a pair of hooks configured to engage an inner portion of the calliper. Preferably, the hooks can be urged apart to engage the inner portion of the calliper. The system can further include a clamping member actuable for securing the hooks against the calliper.

Preferably, the calliper support assembly is supported from a shaft to allow rotation of the calliper relative to the vehicle so that the calliper support assembly can self balance on the shaft.

In preferred embodiments, the calliper support assembly includes an engagement member for engaging the calliper, the engagement member being removable from the system to allow the calliper to be secured to an external support for servicing.

In preferred embodiments, the hub engagement assembly includes an actuator for removing the hub and rotor assembly from the vehicle. Preferably, the hub engagement assembly is configured to engage wheel studs of the hub and rotor assembly and the actuator is configured to act upon the hub engagement assembly and an axle of the vehicle to advance the hub and rotor assembly over the axle and from the vehicle. The actuator can be a hydraulic ram.

Preferably, the actuator is adaptable for removal of the rotor from the hub following removal of the hub and rotor assembly.

The system can further include a carousel for supporting a replacement rotor to be installed on the hub and a rotor removed from the hub and rotor assembly, the carousel rotatable to move the removed rotor away from the hub and advance the replacement rotor toward the hub for installation. The system can further include a guide for guiding the rotor to and from the hub engagement assembly to the carousel.

In some embodiments, the system includes a service trolley and a support trolley, the calliper support assembly being fixed to the service trolley and the hub engagement assembly being fixed to the support trolley. The first and second trolleys may be interengagable to facilitate movement of the rotor from the support trolley to the service trolley.

According to another embodiment of the present invention, there is provided a method of removing a heavy vehicle brake assembly from a vehicle, including:
  engaging a calliper with a calliper support assembly;
  engaging an in-situ hub and rotor assembly with a hub engagement assembly;

removing the calliper from the vehicle;
removing the hub and rotor assembly from the vehicle; and
lifting the hub engagement assembly to facilitate servicing.

In some embodiments, the calliper and the hub and rotor assembly are removed together. In alternative embodiments, the calliper is lifted and retracted from the vehicle prior to engagement of the hub and rotor assembly.

BRIEF DESCRIPTION OF THE DRAWINGS

Preferred embodiments of the invention will be further described, by way of non-limiting example only, with reference to the accompanying drawings in which.

DETAILED DESCRIPTION

Figure 1:
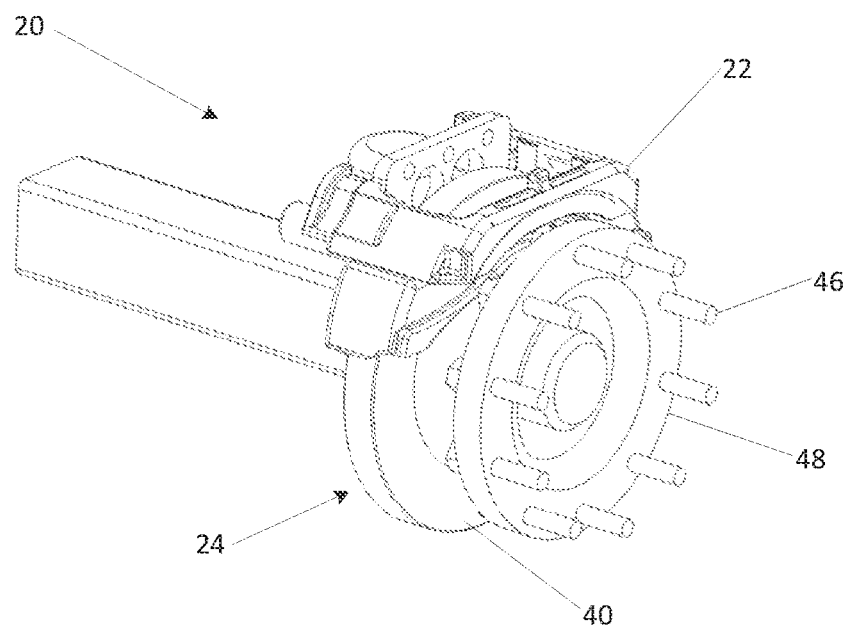
FIG. 1 is a perspective view of a heavy vehicle brake assembly.
Figure 2:
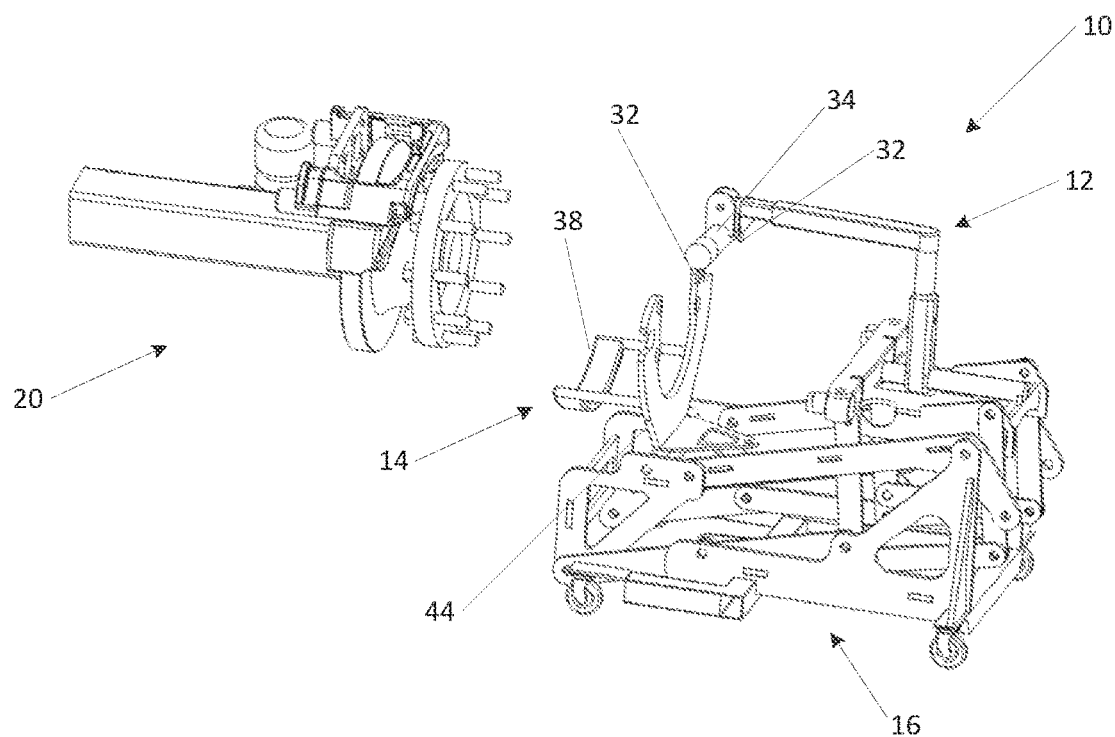
FIG. 2 is a perspective view of the brake assembly and a trolley of one embodiment of the invention.

FIG. 2 illustrates a trolley 10 according to a preferred embodiment of the invention. The trolley 10 is configured for supporting a heavy vehicle brake assembly 20. The trolley 10 is configured to engage and support the brake assembly 20 to facilitate removal and installation.

The trolley 10 includes a calliper support assembly 12 configured to engage and support an in-situ calliper 22. The calliper support assembly 12 is movable with the calliper 22 engaged to remove and subsequently reengage a calliper 22 with the brake assembly 20.

The trolley 10 also includes a hub engagement assembly 14 configured to engage an accessible portion of an in-situ hub and rotor assembly 24. The hub engagement assembly 14 is configured to support and move the engaged hub and rotor assembly 24 between an in-situ position and a removed position to facilitate removal and installation of the hub and rotor assembly 24.

The trolley 10 also includes means within the trolley for raising the hub engagement assembly 14, thereby raising the hub and rotor assembly 24, to facilitate servicing. In the illustrated embodiment, the means for raising the hub engagement assembly 14 is integrated within the trolley 10 and in the form of a lifting device 16 which is illustrated in the form of a scissor lift mechanism and a hydraulic cylinder, though it will be appreciated that other forms are also possible.

Figure 3:
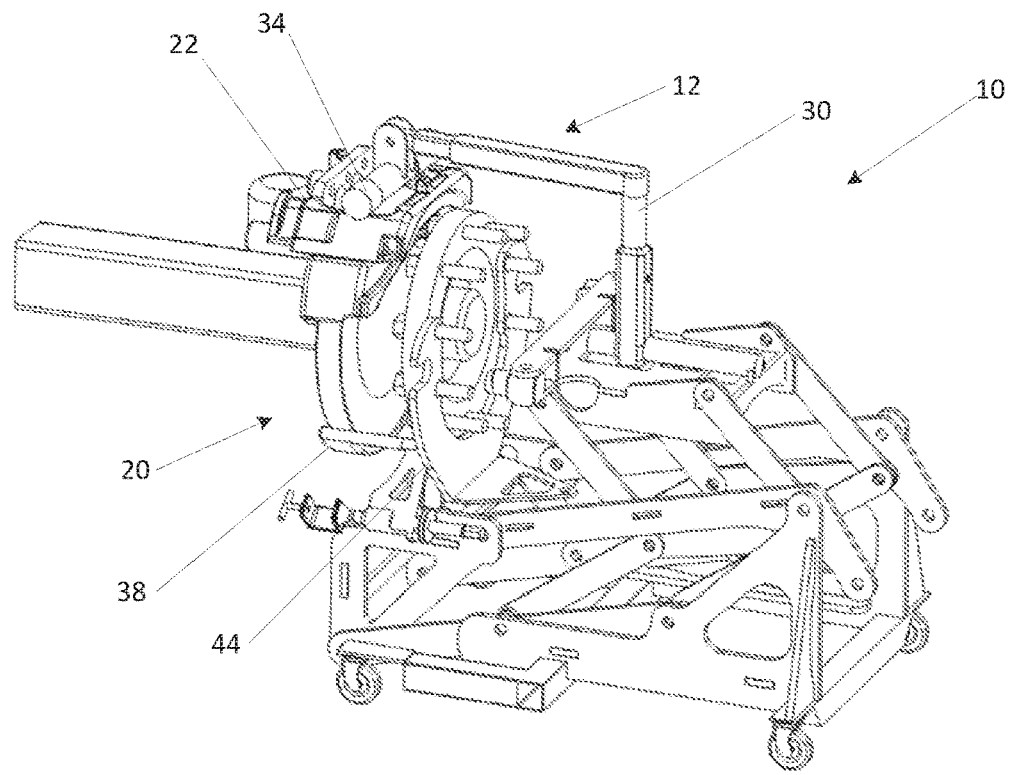
FIG. 3 is a perspective view of the trolley engaging the brake assembly.

FIG. 2 illustrates the trolley 10 positioned near a heavy vehicle brake assembly 20 and in a ready to use condition. FIG. 3 illustrates the trolley 10 positioned near the brake assembly 20, ready for engagement. The trolley 10 is provided with rollers in the form of swivel castors so as to be configured to be positionable relative to the brake assembly 20 for engagement thereof and movable away from the vehicle to facilitate removal of the brake assembly 20.

As illustrated in FIG. 3, the calliper support assembly 12 is brought into engagement with the calliper 22 and the hub engagement assembly 14 is brought into engagement with the hub and rotor assembly 24. It may be that the trolley 10 is lowered to a lowermost condition for placement relative to the brake assembly and then raised to a required level for engagement with the brake assembly 20.

The calliper support assembly 12 includes a pair of hooks 32 extended from opposite ends of bar 34 than can be manipulated to engage an inner portion of the calliper 22 so as to engage and support the calliper 22.

The hub engagement assembly 14 includes a lower support 38 for supporting the brake rotor 40 and a stud engagement member 44 for engaging wheel studs 46 of the hub 48. As illustrated in FIG. 3, the stud engagement member 44 is configured to engage only 4 wheel studs 46 to support the brake assembly. The stud engagement member 44 has slots or apertures in which the wheel studs 46 can be received. Wheel nuts (not shown) may be applied to the wheel studs 46 to secure the trolley and brake assembly 20 together.

Figure 4:
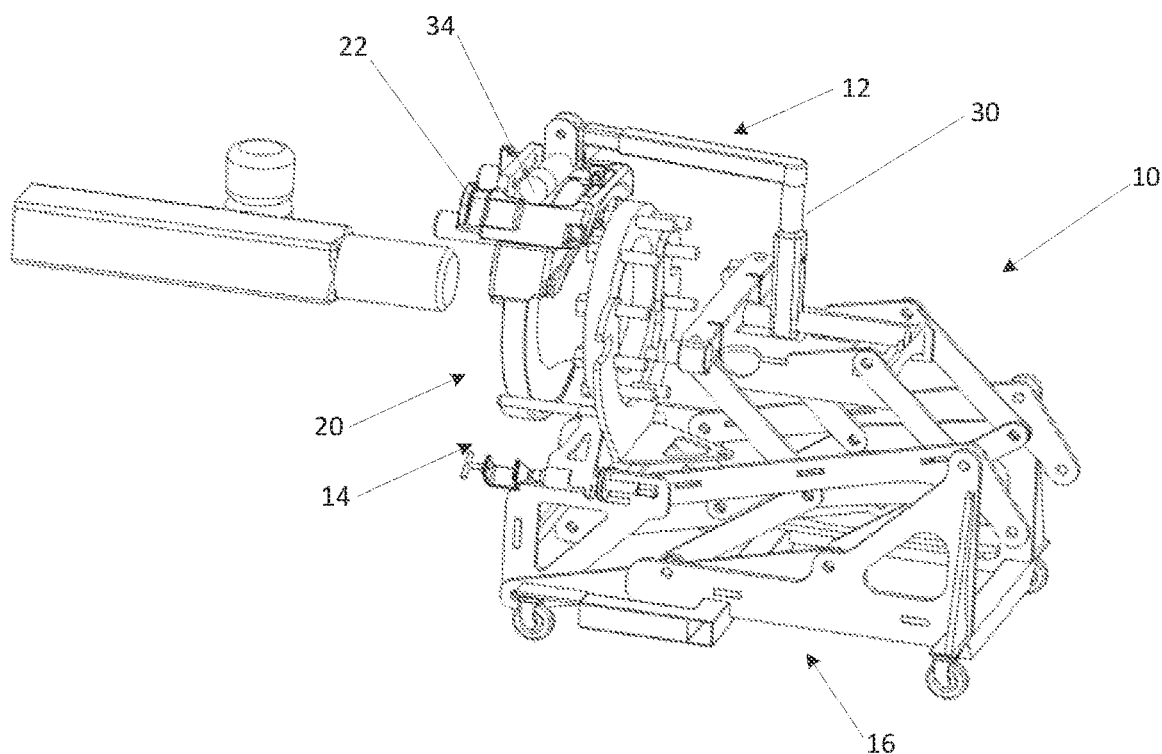
FIG. 4 is a perspective view of the trolley positioned away from the vehicle with the brake assembly fixed thereto.

Once the calliper support assembly 12 and the hub engagement assembly 14 have been brought into engagement with the calliper 22 and the brake assembly 20, the trolley 10 can be moved away from the vehicle to remove the brake assembly 20 therefrom, as illustrated in FIG. 4. To remove the brake assembly 20 from the vehicle, mechanical assistance may be required and a device such as a 5 ton hydraulic press (not shown) may be used. The hydraulic press may be a separate component or may be integrated into the trolley 10.

Figure 5:
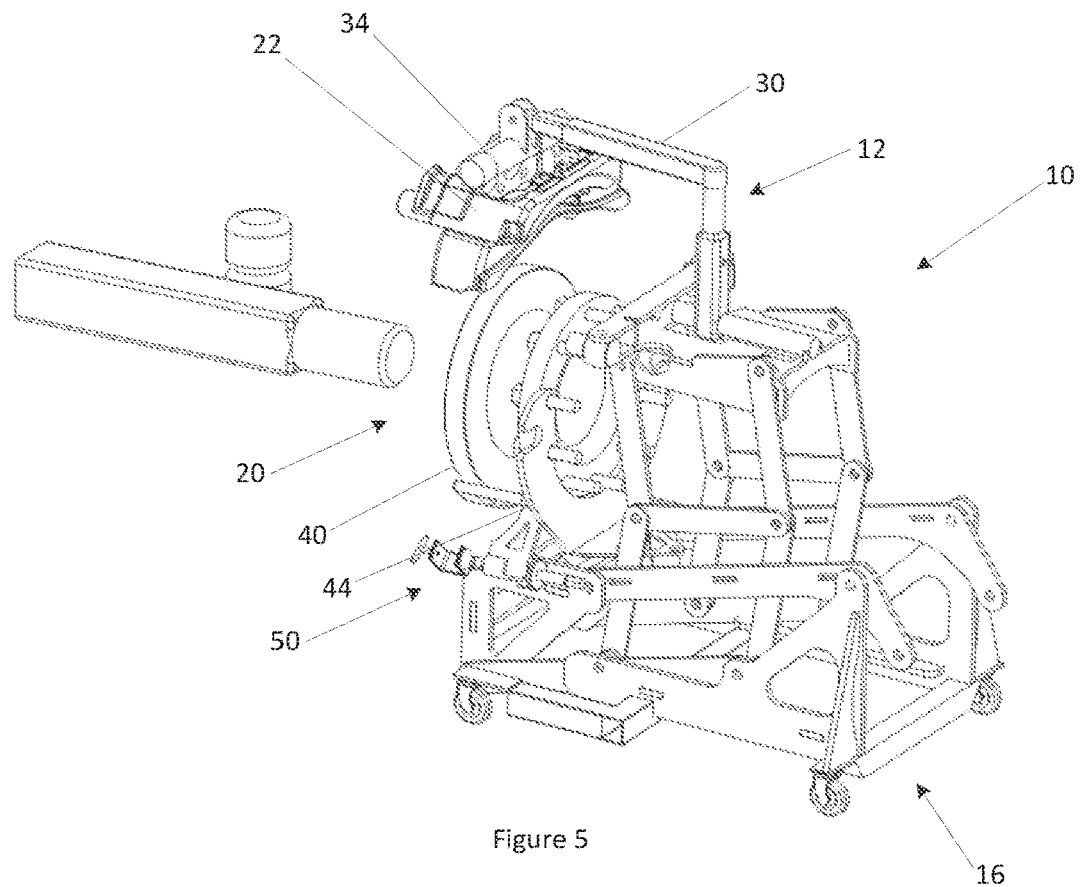
FIG. 5 is a perspective view of the trolley and brake assembly with the calliper lifted from the brake assembly.
Figure 6:
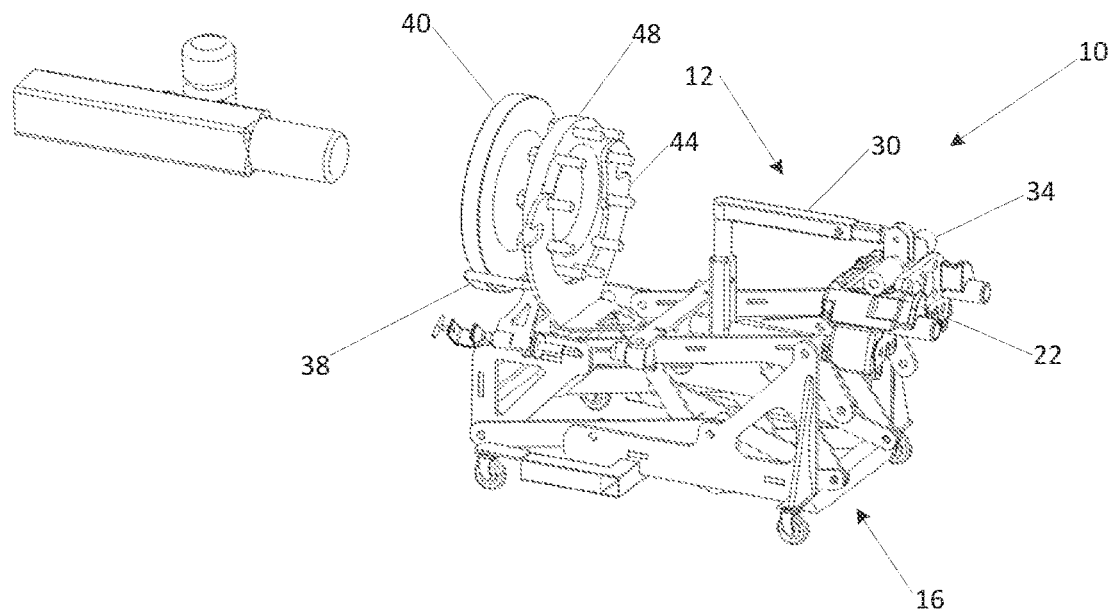
FIG. 6 is a perspective view of the trolley and brake assembly with the calliper removed from the brake assembly.

Once the brake assembly 20 has been removed from the vehicle, the calliper support assembly 12 is operable to lift the calliper 22 away from the brake assembly 20, as illustrated in FIG. 5. A hydraulic lift (not shown) may be provided for this purpose. The swing arm 30 can then be manipulated to swing the calliper 22 from the brake assembly 20 for better access by a service technician, as illustrated in FIG. 6.

In some embodiments, the calliper support assembly 12 may be operable so that once the calliper 22 has been engaged, its weight is supported by the calliper support assembly 12 so that a technician is not required to lift the calliper 22 for removal from the brake assembly 20. Also, a device for separating halves of the calliper 22 may also be provided, though it will be appreciated that it may be more convenient to do this once removed.

Figure 7:
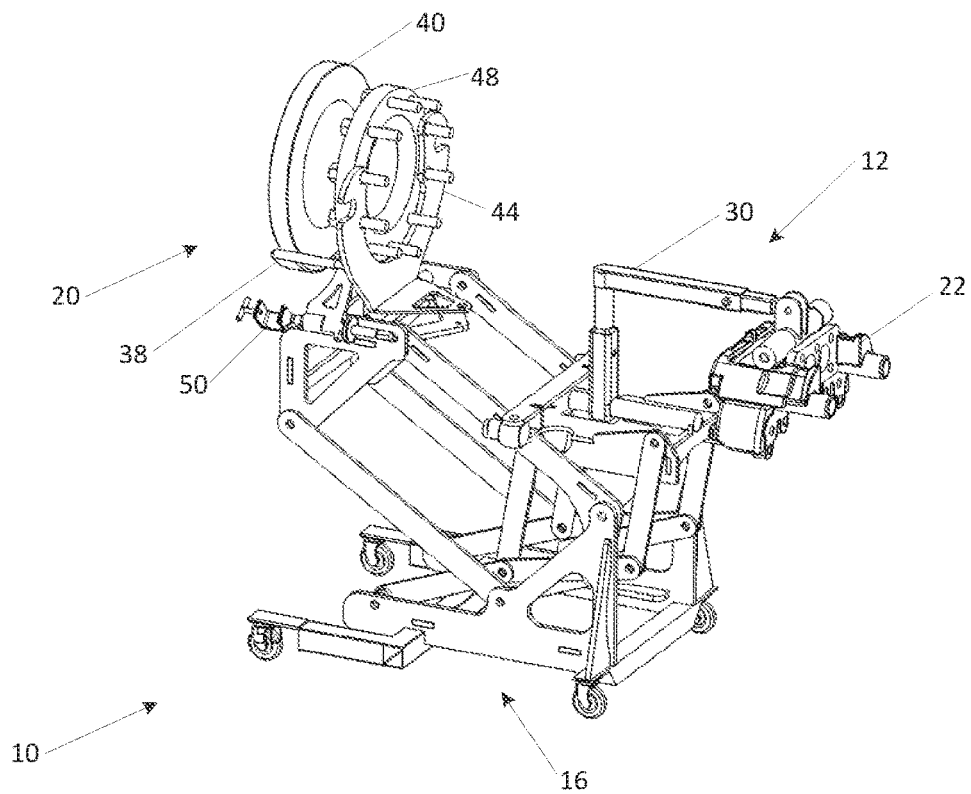
FIG. 7 is a perspective view of the trolley in a raised configured showing the brake assembly lifted to a position for service.
Figure 8:
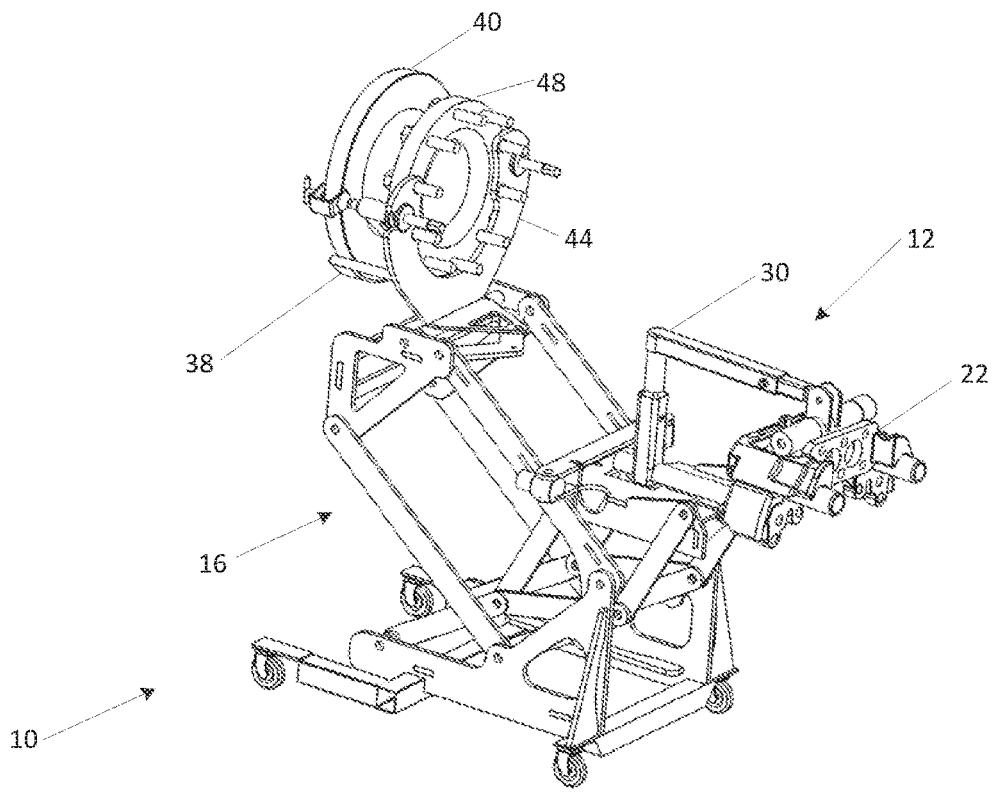
FIG. 8 is a perspective view of the trolley in a raised configured showing the brake rotor removed from the hub assembly.
Figure 9:
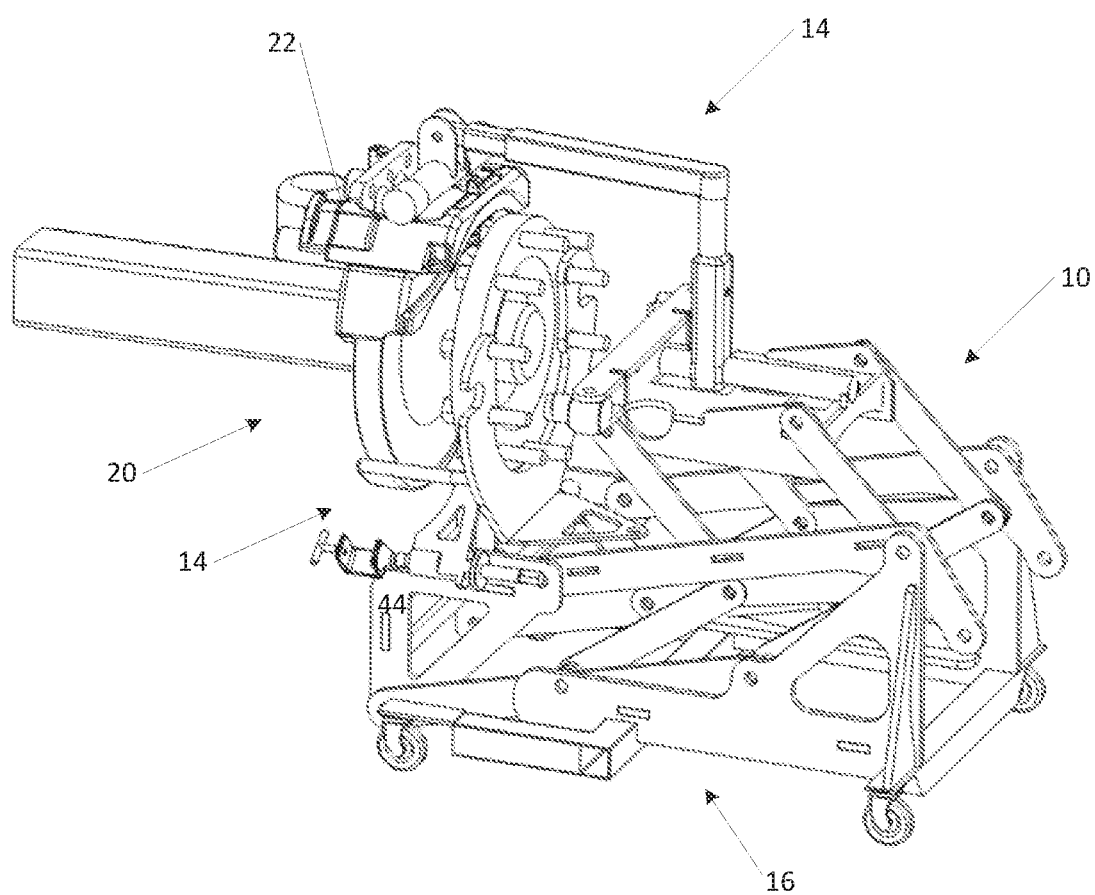
FIG. 9 is a perspective view of the trolley with the brake assembly returned to the vehicle for reinstallation.

Once the calliper 22 has been moved away from the brake assembly 20, the lifting device 16 can be operated to raise the hub and rotor assembly 24 to a convenient level to facilitate servicing by a service technician, as illustrated in FIG. 7. It will be appreciated that the lifting device 16 will be capable of lifting the hub and rotor assembly through a range of heights to allow the trolley 10 to be used by service technicians of different sizes.

A separator 50 may also be provided to allow the rotor 40 to be separated from the hub 48 while the rotor and hub assembly 24 is fixed to the trolley 10. In the illustrated embodiment, the separator 50 includes a pair of screw thread operated presses to provide a separation force, though it will be appreciated that other forms are as possible, such as a small hydraulic press or a lever operated mechanism. Once the rotor 40 and hub 48 have been separated, the rotor 40 is still supported by the lower support 38 and the hub is still supported by the stud engagement member 44 and a service technician is free to inspect and/or replace the rotor 40, along with the hub 48 and bearings (not shown) within the hub.

The lower support 38 may be configured so as to swing the rotor 40 from the trolley 10, with the rotor 40 secured thereto, to allow inspection and/or replacement The lifting device 16 includes a plurality of elongate members that act as a scissor lift mechanism, which in combination with a hydraulic cylinder allow the trolley 10 to act like a convention trolley jack to lift the brake assembly 20. In this regard, a twist-lock handle may be provided for operating the hydraulic cylinder. It will be appreciated that the lifting device 16 may take many other forms and include, for example, a pneumatic cylinder or an electrically operated power screw. Also, it will be appreciated that the lifting device may be in the form of a plurality of smaller lifting devices acting on different parts of the trolley 10 so as to lift the rotor and hub assembly 24 in stages.

Once the rotor 40 and hub 48 have been inspected and serviced, they can be reassembled using a procedure which is generally the reverse of the disassembly procedure discussed above. In this regard, the rotor 40 and hub 48 can be brought back into engagement with each other. The separator 50 may also be configured to press the rotor 40 and hub 48 together to form a hub and rotor assembly 24. The lifting device 16 can then be operated to lower the hub and rotor assembly 24 so that the calliper 22 may be reinstalled. Once the calliper 22 has been reinstalled, the trolley 10 can then be positioned relative to the vehicle for reinstallation.

Figure 10:
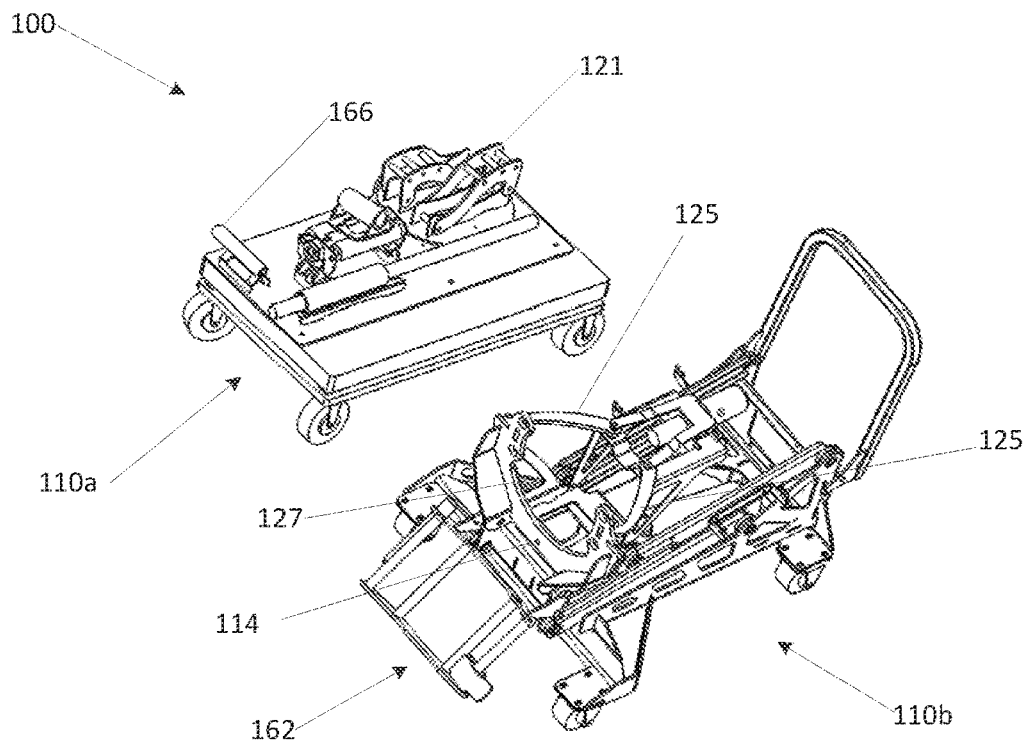
FIG. 10 is a perspective view of a system for removing and reinstalling a heavy vehicle brake assembly of another embodiment of the invention.

FIG. 10 illustrates a system 100 according to another preferred embodiment of the invention. The system 100 includes trolleys 110a and 110b and is configured for removing and reinstalling a heavy vehicle brake assembly 120.

The system 100 includes a calliper support assembly 112, a hub engagement assembly 114 and means, in the form of lifting device 116, within the system for raising the brake assembly to facilitate servicing.

The calliper support assembly 112 is configured to engage and support an in-situ calliper 122. The calliper support assembly 112 is liftable and retractable from the vehicle with the calliper 122 engaged to remove and subsequently reengage a calliper 122 with the hub assembly 124.

Figure 14:
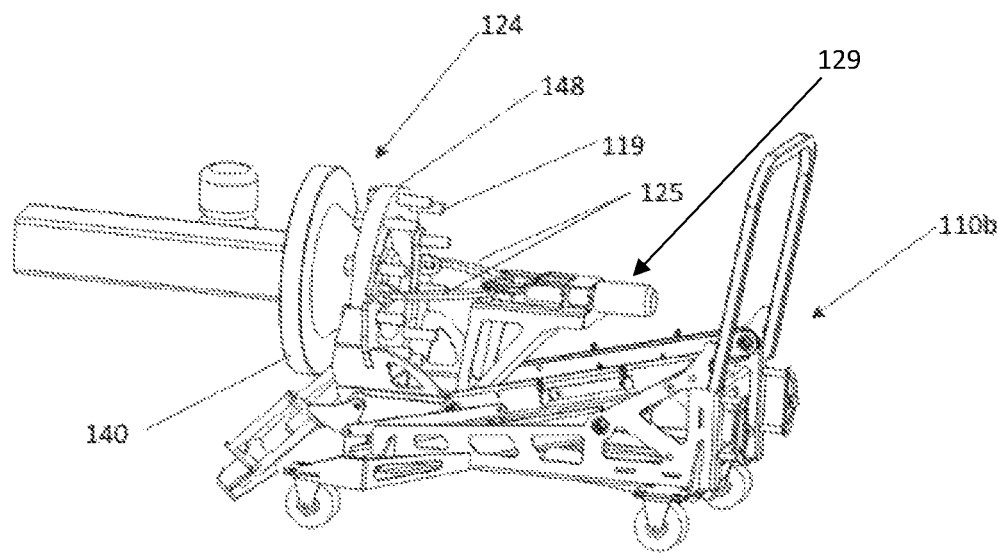
FIG. 14 is a side perspective view of a support trolley of the system in a first condition of use.
Figure 15:
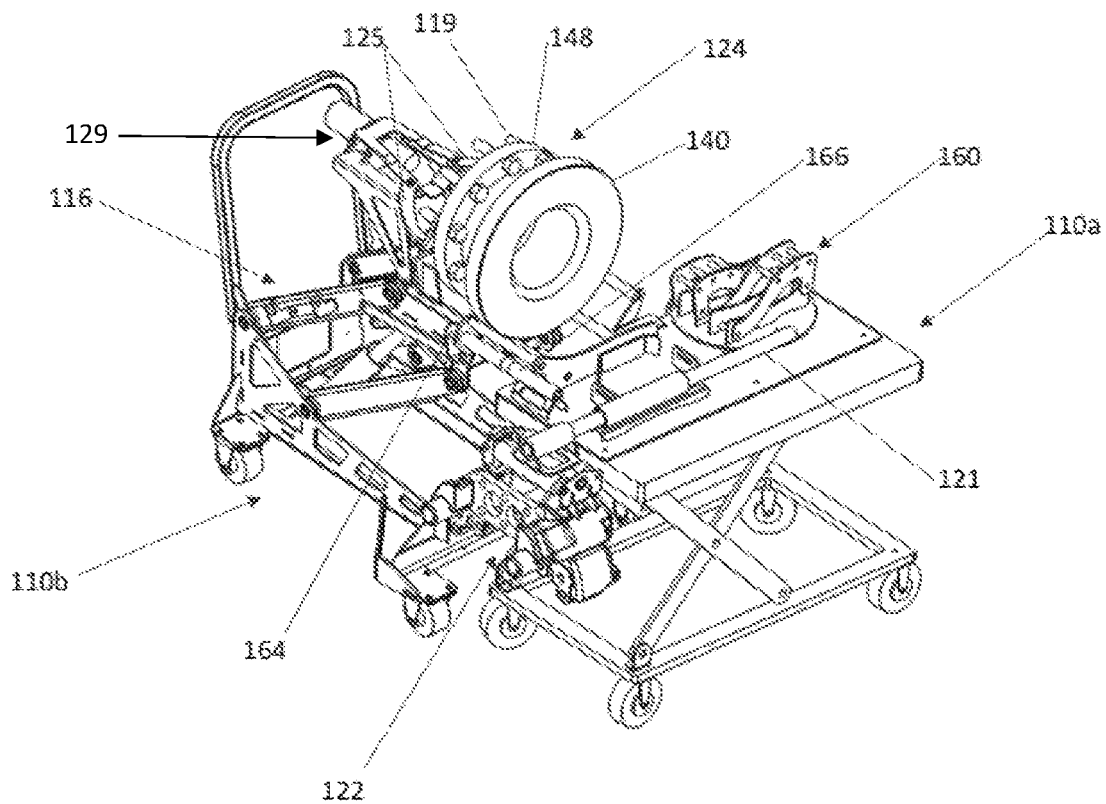
FIG. 15 is a side perspective view of the support trolley in another condition of use.

The hub assembly 124 is illustrated in FIGS. 14 and 15 and includes a rotor 140 and hub 148.

The hub engagement assembly 114 is configured to engage an accessible portion of the in-situ hub and rotor assembly 124. The hub engagement assembly 114 is configured to support and move the engaged hub and rotor assembly 124 between an in-situ position and a removed position for removal and reinstallation of the hub and rotor assembly 124.

In the illustrated embodiment, the means for raising the hub engagement assembly 114 is integrated within trolley 110b and is in the form of a lifting device 116, as illustrated in FIG. 15, which is illustrated in the form of a lift mechanism and a hydraulic cylinder, though it will be appreciated that other forms are also possible.

In the illustrated embodiments, the system includes a service trolley 110a and a support trolley 110b. In other embodiments, such as those shown in FIGS. 1 to 9, the system may be incorporated into a single trolley. It will also be appreciated that the system may include more than two trolleys, such as three or four, for example. In the illustrated embodiments, the calliper support assembly 112 is fixed to the service trolley 110a and the hub engagement assembly 114 is fixed to the support trolley 110b. Each trolley 110a, 110b is provided with rollers in the form of swivel castors so as to be configured to be positionable relative to each other and the brake assembly 120 for engagement thereof and movable away from the vehicle to facilitate removal of the brake assembly 120.

Figure 11:
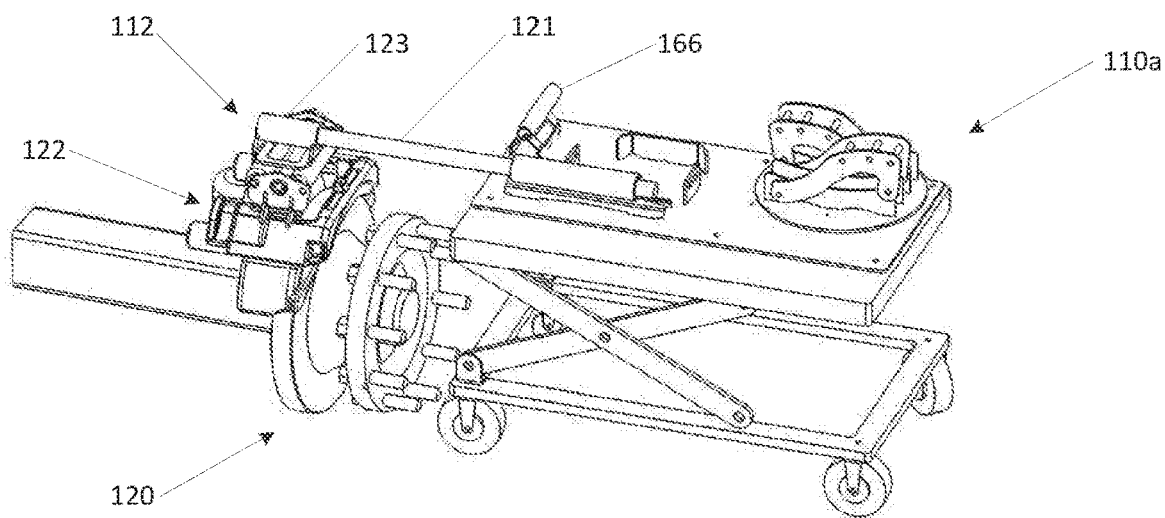
FIG. 11 is a perspective view of a service trolley of the system.

FIG. 11 illustrates the service trolley 110a positioned near the brake assembly 120, ready to commence removal of the heavy brake assembly. The calliper support assembly 112 is fixable to the calliper 122 via a pair of hooks 132 configured to engage an inner portion of the calliper 122. The hooks 132 are brackets with hook portions for engaging the calliper 122, although they may also be similar to hooks 32 previously described. In use, the hooks 132 are mounted on sliders 133 so as to be urged apart to engage the inner portion of the calliper 122. The system 100 can further include a clamping member 135 actuable for securing the hooks 132 against the calliper 122.

Figure 13:
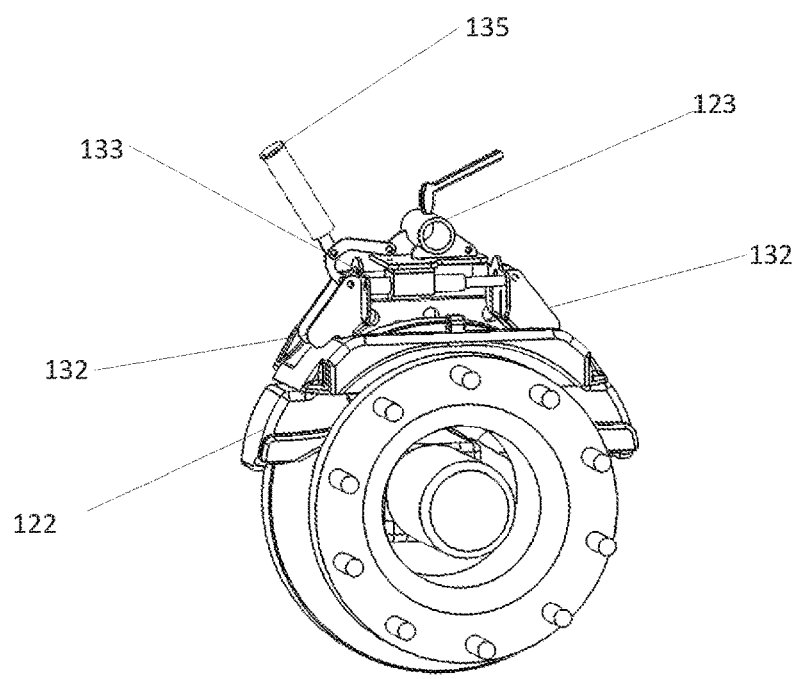
FIG. 13 is a side view of an engagement member of a calliper support assembly fitted to a brake rotor.

The calliper support assembly 112 also includes an engagement member 123 for engaging the calliper 122. The engagement member 123 is removable from the calliper support assembly 112, as can be seen in FIG. 13, to allow the calliper 122 to be secured to an external support, such as a bench mounted vice, for servicing. The engagement member 123 is supported from a shaft 121 to allow rotation of the calliper 122, once removed, relative to the vehicle so that the engagement member 123 can self balance on the shaft 121. This enables the engagement member 123 to return to a natural position of balance in use, thereby assisting removal and installation. Mounting the engagement member 123 on shaft 121 also allows the calliper 122 to be easily extended from or retracted relative to the service trolley 110a.

In use, brake pads (not shown) are removed from the calliper 122 and retaining bolts removed. The service trolley 110a is then positioned near the brake assembly 120 and the engagement member 123 of the calliper support assembly 112 extended to engage the calliper 122. Hooks 132 are advanced outwardly on sliders 133 and clamping member 135 actuated to secure the hooks 132 against the calliper 122. The service trolley 110 can then be lifted, via a lifting device (not shown) to disengage the calliper 122 from the brake assembly 120.

Figure 12:
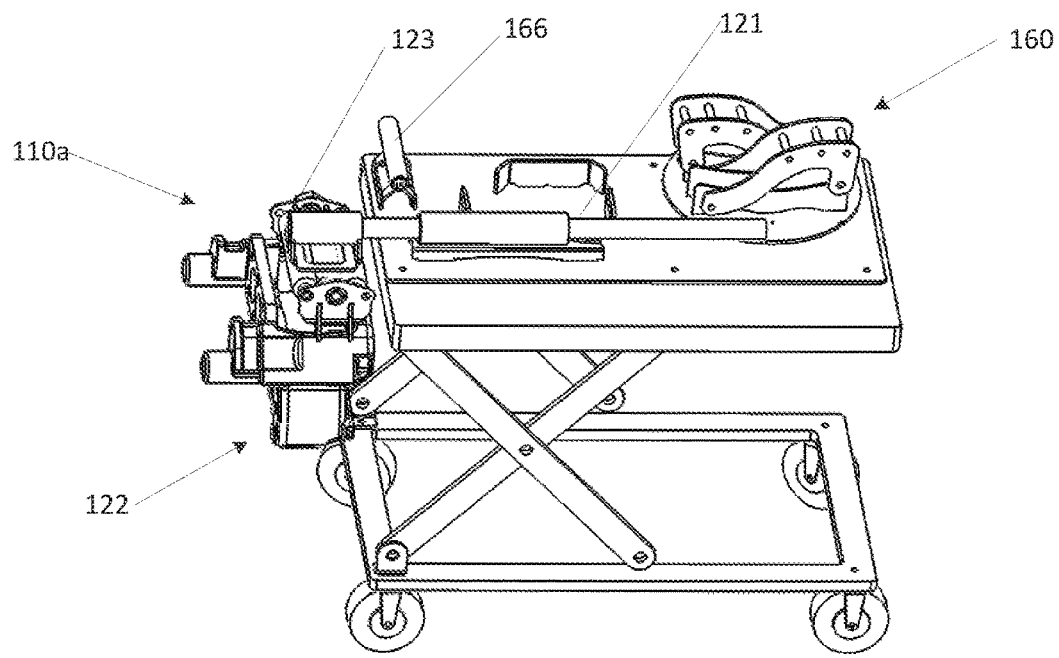
FIG. 12 is a side perspective view of the service trolley.

The service trolley 110a can then be wheeled away to remove the calliper 122. If servicing of the calliper 122 is required, the calliper 122 may be transported to a support device, such as a bench vice (not shown), to which it can be secured. If servicing of the calliper 122 is not required, the engagement member 123 can be retracted so that the calliper 122 may simply be positioned against the service trolley 110a, as illustrated in FIG. 12 or 15.

The hub engagement assembly 114 includes an actuator 129 for removing the hub and rotor assembly 124 from the vehicle. The hub engagement assembly 114 includes a mounting plate 127 which is configured to engage wheel studs 119 of the hub and rotor assembly 124. In this regard, the mounting plate 127 has apertures through which the wheel studs 119 can be received. The mounting plate 127 is fixed to the hub and rotor assembly 124 by applying a number of wheel nuts (not shown) to the wheel studs 119. The hub engagement assembly 114 also includes jaw members 125 which have at one end hook portions that are configured to engage corresponding apertures in the mounting plate 127.

The actuator 129 is configured to act, at one end, on the mounting plate 127, and at the other end, upon an axle of the vehicle to advance the hub and rotor assembly over the axle and from the vehicle. The actuator is preferably a hydraulic ram, though may also be pneumatic cylinder or linear actuator. Also, the actuator may include an intermediate extension member, that can be extendable via a screw thread to assist with setup and operation of the actuator so that the stroke of the actuator can be minimised.

The hub engagement assembly 114 may also include a further set of jaw members (not shown), that can extend around the hub 148 and engage the rotor 140, whereby reversing the actuator 129 results in separation of the rotor 140 from the hub 148. As such, the actuator is adaptable for removal of the rotor 140 from the hub 148 following removal of the hub and rotor assembly 124.

The system 100 can further include a carousel 160 which, in the illustrated embodiment, is fitted to the service trolley 110a. The service trolley 110a and the support trolley 110b are configured for interengagement, as will be described further below, to allow transfer of the rotor 140 from the hub and rotor assembly 124 to the service trolley 110a for replacement. The carousel 160 is configured for supporting a replacement rotor 140a to be installed on the hub 148 and a rotor 140b removed from the hub and rotor assembly 124. The carousel 160 is rotatable to move the removed rotor 140b away from the hub 148 and advance the replacement rotor 140 toward the hub 148 for installation.

The system 100 can further include a guide 162 on the support trolley 110b for guiding the rotor 140 to and from the hub engagement assembly 124 to the carousel 160. The guide 162 is preferably a plurality of parallel rails along which the rotor 140 can slide, though it will be appreciated that various other embodiments are possible.

In use, the service trolley 110a is brought into engagement with the support trolley 110b, the hub 148 separated from rotor 140b, and the rotor transferred along guide 162 to carousel 160. A replacement rotor 140 may already be loaded onto the carousel 160, which can simply be rotated to remove the removed rotor 140b and bring the replacement rotor 140 into a position for easy installation.

In some embodiments, the system includes a service trolley 110a and a support trolley 110b, calliper support assembly 112 being fixed to the service trolley 110a and the hub engagement assembly 114 being fixed to the support trolley 110b. In other embodiments, such as those shown in FIGS. 1 to 9, the system may include a single trolley. It will also be appreciated that the system may include more than two trolleys, such as three or four, for example.

Figure 16:
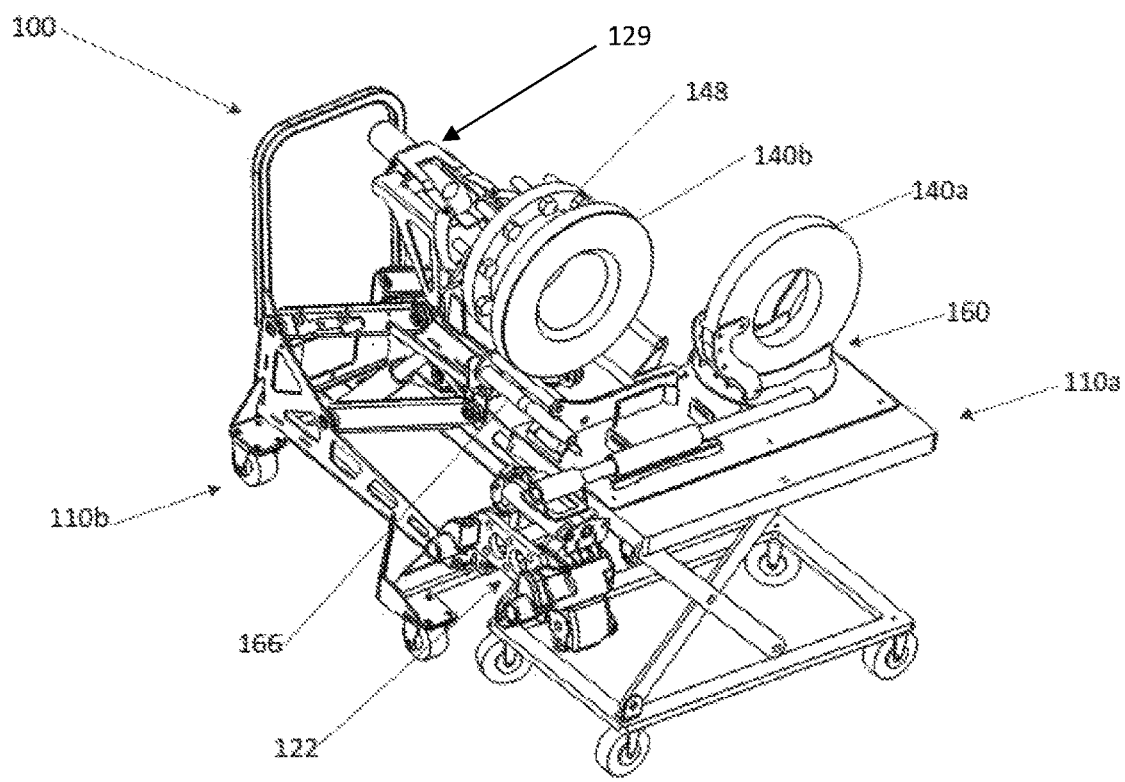
FIG. 16 is an upper perspective view of the system in use.
Figure 17:
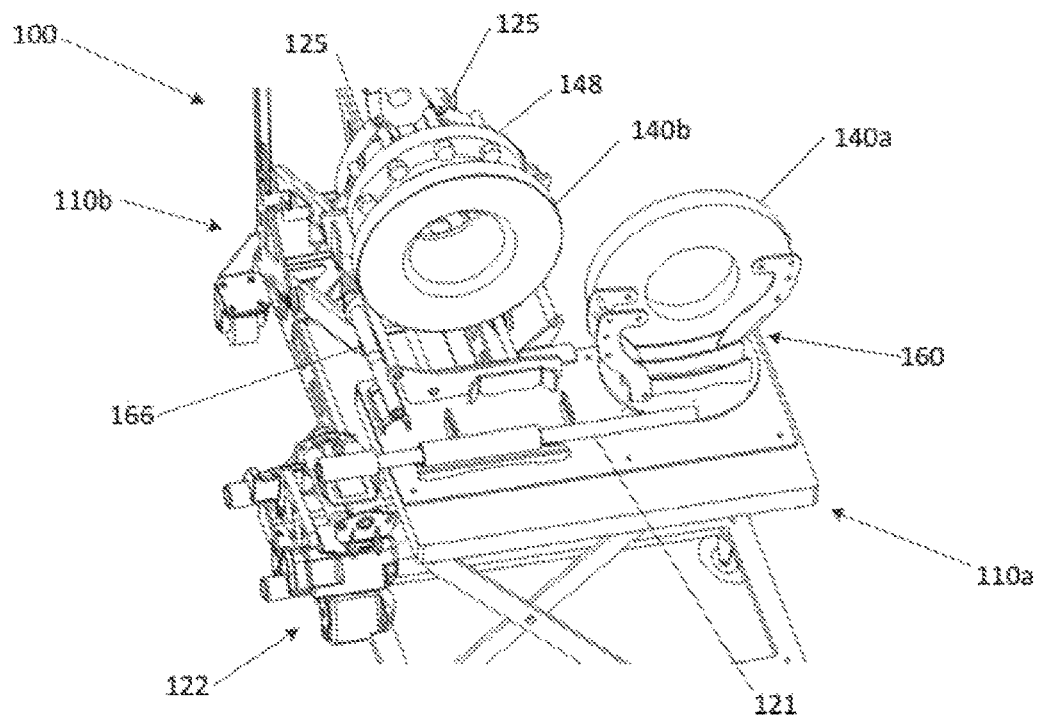
FIG. 17 is an upper side perspective view of the system in use.

As illustrated in FIGS. 15 to 17, the service trolley 110a and the support trolley 110b may be interengagable to facilitate movement of the rotor 140 from the support trolley 110b to the service trolley 110a. In this regard, an extension 164, which in the illustrated embodiment in a shaft, extends from the support trolley 110b for engagement with a corresponding sleeve 166 on the service trolley 110a. The extension 164 is preferably securable to the service trolley 110a to prevent relative movement between the trolleys. In other embodiments, other releasable alignment and fixing methods may similarly be used.

In use, the system 100 operates by engaging the calliper 122 with the calliper support assembly 112, engaging an in-situ hub and rotor assembly 124 with a hub engagement assembly 114, removing the calliper 122 from the vehicle, removing the hub and rotor assembly 124 from the vehicle; and lifting the hub engagement assembly 114 to facilitate servicing.

In some embodiments, such as those illustrated in FIGS. 1 to 9, the calliper 22 and the hub and rotor assembly 24 are removed together. In alternative embodiments, such as those illustrated in FIGS. 11 to 17, the calliper 122 is lifted and retracted from the vehicle prior to engagement of the hub and rotor assembly 124.

Once the rotor 140 and hub 148 have been inspected and serviced, they can be reassembled using a procedure which is generally the reverse of the disassembly procedure discussed above. In this regard, the service trolley 110a and the support trolley 110b can be separated and the rotor 140 and hub 148 can be brought back into engagement with each other and secured together. The actuator of the hub engagement assembly may also be configured to press the rotor 140 and hub 148 together to form a hub and rotor assembly 124. The lifting device 116 can then be operated to lower the hub and rotor assembly 124 for reinstallation on the vehicle, after which time the calliper 22 may be reinstalled. Once the calliper 22 has been reinstalled, the trolley 10 can then be positioned relative to the vehicle for reinstallation.

It will be appreciated by those skilled in the art that the described trolley 10 and system 100 may allow the removal, servicing and replacement of a heavy vehicle brake assembly by a single technician without requiring heavy lifting and at a much faster rate than was previously possible.

The embodiments have been described by way of example only and modifications are possible within the scope of the invention disclosed.

Having thus described the invention, it is now claimed:

1. An apparatus for use in servicing a heavy vehicle brake assembly comprising:
    a calliper support assembly configured to engage and support an in-situ calliper, the calliper support assembly being movable with the calliper engaged to remove and subsequently reengage the calliper with hub and rotor assembly of a vehicle;
    a hub engagement assembly configured to engage an accessible portion of the in-situ hub and rotor assembly;
    a hub removal mechanism configured to forcibly remove the hub and rotor assembly from an axe of the vehicle in cooperation with the hub engagement assembly;
    a trolley carrying the hub engagement assembly and configured to support and move the engaged hub and rotor assembly between an in-situ position and a removed position to facilitate removal and installation of the hub and rotor assembly; and
    means within the trolley for raising the hub engagement assembly to facilitate servicing.

2. The apparatus as claimed in claim 1, further including separation means for separating the rotor and the hub following removal of the hub and rotor assembly from the vehicle, the separation means being configured to support the rotor during removal from the hub.

3. The apparatus as claimed in claim 1, wherein the hub engagement assembly is configured to engage wheel studs of the hub assembly.

4. The apparatus as claimed in claim 1, wherein the calliper support assembly is mounted to the trolley on a swing arm to allow the supported calliper to be removed from the hub and rotor assembly.

5. The apparatus according to claim 1, wherein the calliper support assembly is supported from a shaft to allow rotation of the supported calliper relative to the vehicle so that the calliper support assembly can self-balance on the shaft.

6. The apparatus according to claim 1, wherein the hub removal mechanism includes an actuator mounted on the trolley and adapted to in use apply force between the hub and rotor assembly and the vehicle axle to effect removal of the hub and rotor assembly from the vehicle.

7. The apparatus according to claim 6, wherein the hub engagement assembly includes a face plate configured to engage wheel studs of the hub, and wherein the hub removal mechanism includes selectively deployable jaw members coupled to the actuator for engagement with the face plate.

8. The apparatus according to claim 1, wherein the hub removal mechanism includes an actuator mounted on the trolley and adapted, in a first configuration, to apply force between the hub and rotor assembly and the vehicle axle to effect removal of the hub and rotor assembly from the vehicle and, in a second configuration, to apply force between the hub and the rotor to effect separation of the hub and rotor following removal of the hub and rotor assembly from the vehicle.

9. The apparatus according to claim 8, further including a service trolley supporting a rotor replacement assembly configured to receive a rotor removed from the vehicle and position a replacement rotor for engagement with the hub.

10. The apparatus according to claim 9 wherein the trolley and the service trolley are adapted to be temporarily secured to one another to facilitate transfer of the rotor removed from the vehicle and the replacement rotor.

11. The apparatus according to claim 10 wherein the rotor replacement assembly includes a carousel for supporting a replacement rotor to be installed on the hub and a rotor removed from the hub and rotor assembly, the carousel rotatable to move the removed rotor away from the hub and advance the replacement rotor toward the hub for installation or further including a guide for guiding the rotor to and from the hub engagement assembly to the carousel.

12. A system for removing and reinstalling a heavy vehicle brake assembly comprising:
    a calliper support assembly configured to engage and support an in-situ calliper, the calliper support assembly being liftable and retractable from the vehicle with the calliper engaged to remove and subsequently reengage the calliper with a hub and rotor assembly of the vehicle;
    a hub engagement assembly configured to engage an accessible portion of an in-situ hub and rotor assembly, the hub engagement assembly being configured to support and move the engaged hub and rotor assembly between an in-situ position and a removed position for removal and reinstallation of the hub and rotor assembly;
    a hub removal mechanism configured to forcibly remove the hub and rotor assembly from an axle of the vehicle in cooperation with the hub engagement assembly, wherein the system includes a service trolley and a support trolley, the calliper support assembly being mounted to the service trolley and the hub engagement assembly and hub removal mechanism being mounted to the support trolley.

13. A system according to claim 12, wherein the service trolley and support trolleys are interengagable to facilitate movement of the rotor from the support trolley to the service trolley.

14. The system according to claim 12, wherein the hub removal mechanism includes a linear actuator having first and second portions that are moveable relative to one another, at least one first jaw member coupled to the first portion and adapted for engagement with the hub engagement assembly, means coupled to the second portion and adapted for engagement with an axle of the vehicle, and at least one further jaw member coupled to the second portion and selectively deployable to engage with the rotor of the hub and rotor assembly.

* * * * *